Oct. 1, 1968
L. D. GREENWOOD
3,403,856
SPRAYING APPARATUS
Filed Aug. 25, 1966
3 Sheets-Sheet 1
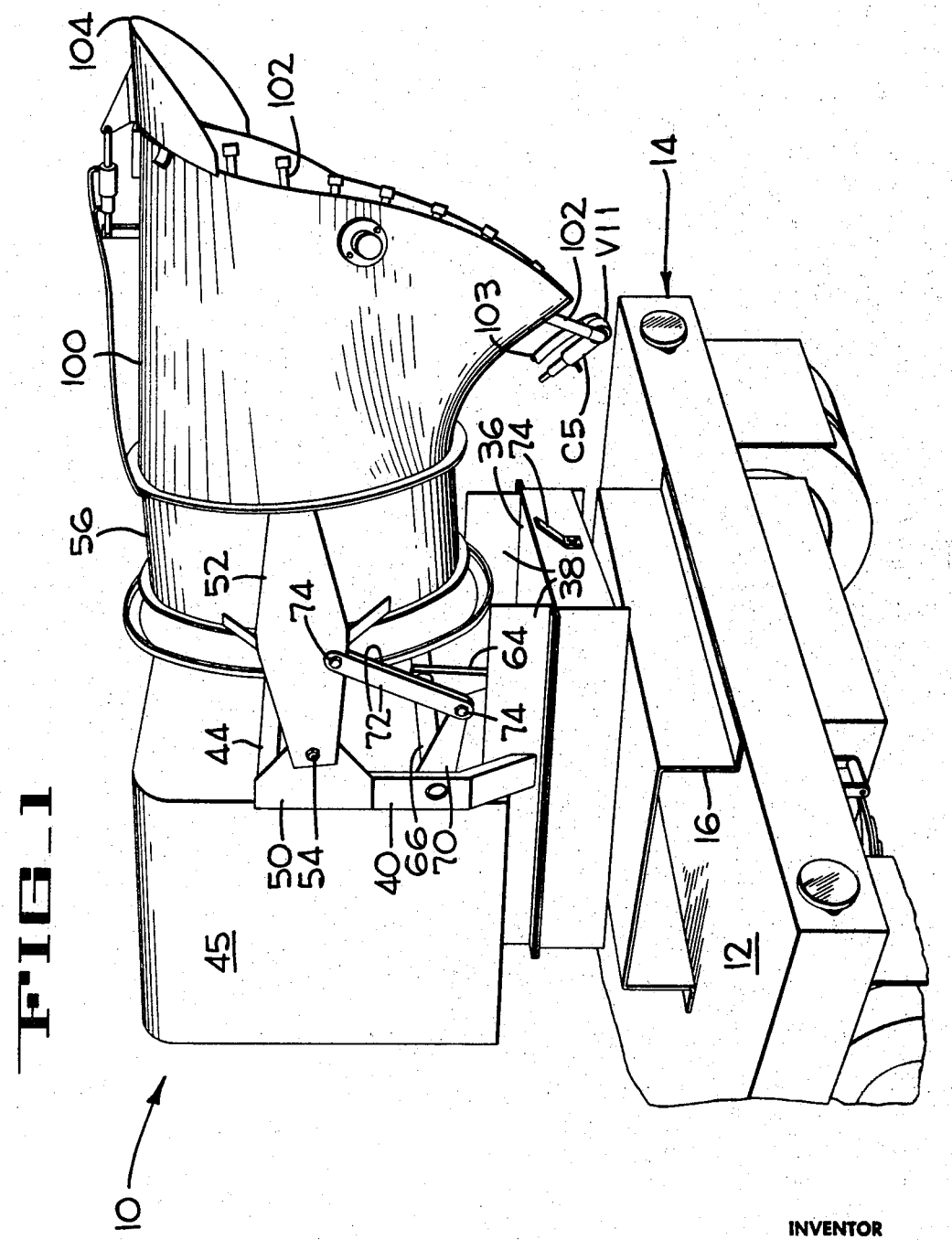
INVENTOR
LEON D. GREENWOOD
BY *Francis W. Anderson*
ATTORNEY

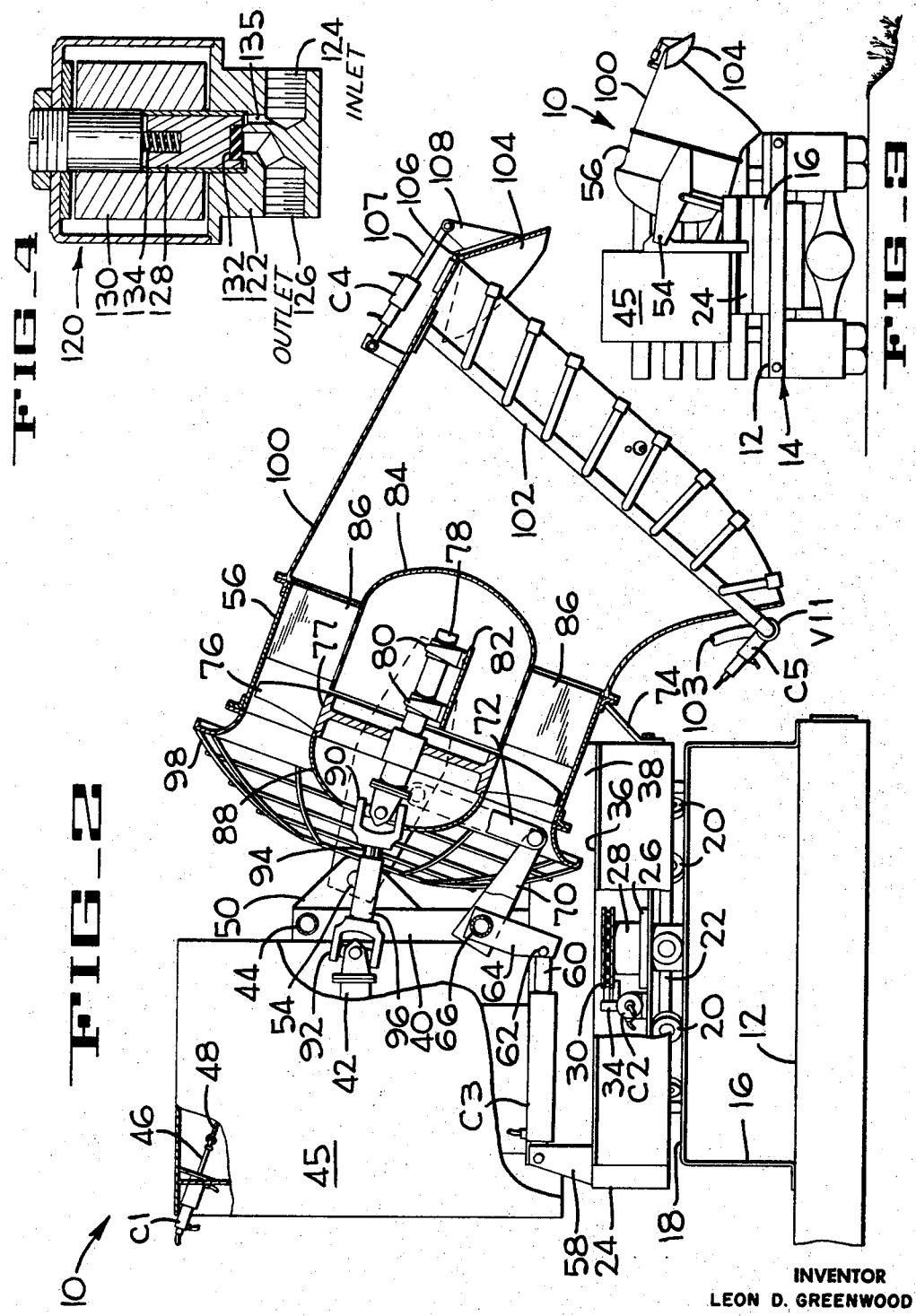

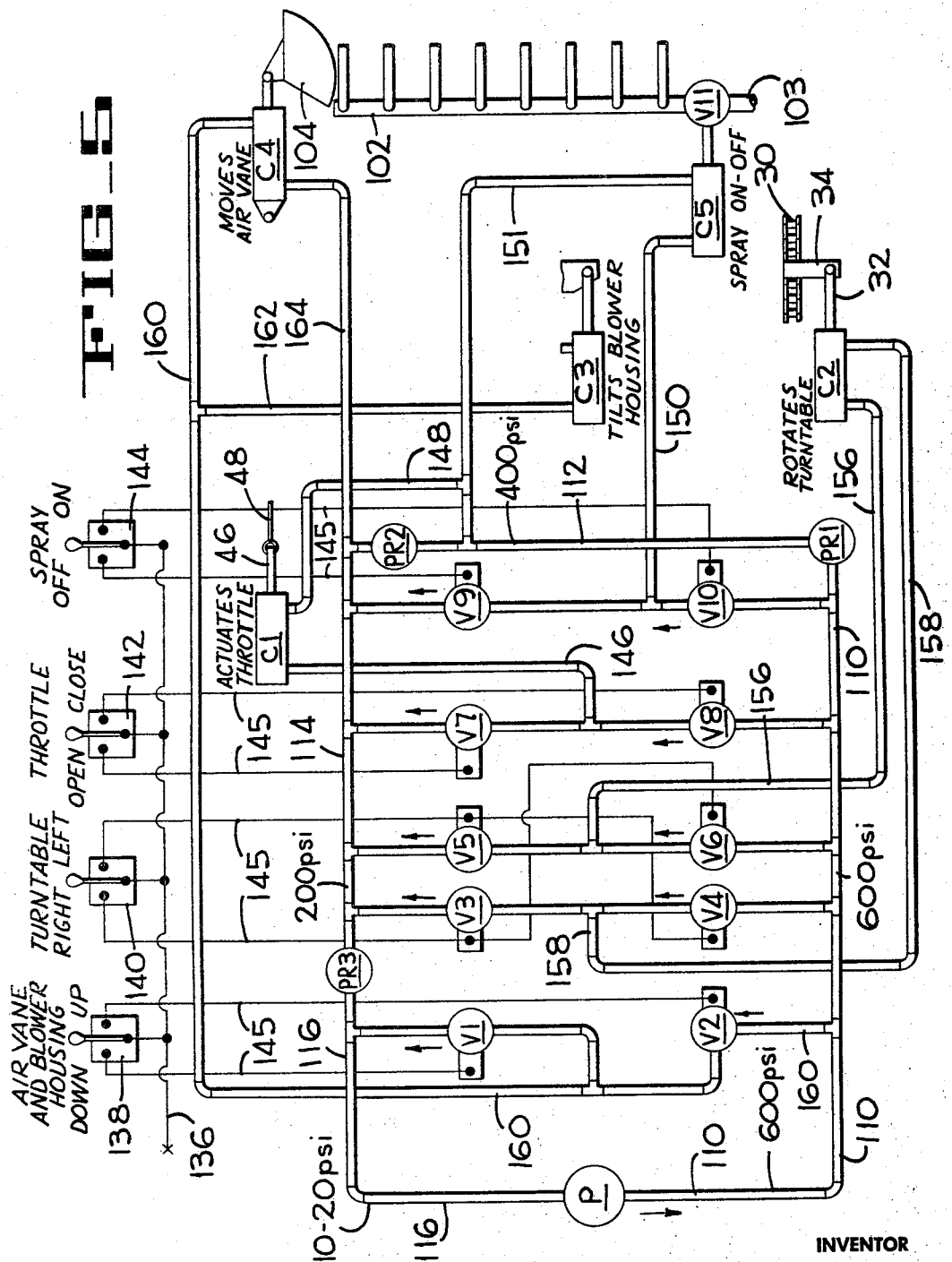

United States Patent Office 3,403,856
Patented Oct. 1, 1968

3,403,856
SPRAYING APPARATUS
Leon D. Greenwood, Lansing, Mich., assignor to FMC
Corporation, San Jose, Calif., a corporation of Delaware
Filed Aug. 25, 1966, Ser. No. 574,998
10 Claims. (Cl. 239—78)

ABSTRACT OF THE DISCLOSURE

A spraying apparatus is mounted on a power driven turntable on the bed of a truck. A gasoline engine drives a power output shaft which is connected by a flexible coupling to a driven impeller shaft in a housing. The housing is pivotally mounted on an axis which is intersected by the axes of the output shaft and the driven shaft. An air deflecting vane is pivotally mounted on the impeller housing and the movement of the vane is synchronized with movement of the housing.

---

The present invention relates to agricultural spraying apparatus which projects an air blast with a liquid chemical or dust entrained in the air blast. More particularly, the present invention concerns a general purpose spraying apparatus which has special utility in several different applications, among which are roadside brush and weed control, tree spraying, and the spraying of ground crops and turf.

The spraying apparatus of the present invention includes general features of the sprayer disclosed in U.S. Patent No. 3,252,656, which is assigned to the assignee of the present invention and is incorporated by reference into this disclosure.

An object of the present invention is to provide spraying apparatus adaptable to a wide variety of different spraying jobs which usually require more than one type of sprayer.

Another object of the invention is to provide spraying apparatus with remotely operable controls for angularly positioning the projected spray blast vertically and horizontally, for regulating the air blast output of the sprayer, and for starting and stopping the supply of spray chemicals into the air blast.

Another object is to provide a spraying apparatus according to the preceding object and having spray blast deflecting means which automatically controls the vertical dimension of the spray pattern according to the angular declination or inclination of the projected spray blast.

Another object is to provide a control circuit for governing the spraying apparatus of the invention, by means of which an operator can remotely start, stop and efficiently control and direct the spray.

FIGURE 1 is a diagrammatic perspective of the spraying apparatus of the present invention mounted on a flat bed truck.

FIGURE 2 is a diagrammatic view, partially in section and partially in elevation, of the spraying apparatus shown in FIGURE 1.

FIGURE 3 is a diagrammatic elevation of the spraying apparatus mounted on the rear of a flat bed truck, and illustrates a roadside spraying operation for which the sprayer is especially adapted.

FIGURE 4 is a diagrammatic section through a typical control valve used in the control circuit of the invention.

FIGURE 5 is a schematic electric-hydraulic control circuit for remotely governing the spraying apparatus.

The spraying apparatus 10 (FIGS. 1–3) is mounted upon the bed 12 of a flat bed truck 14, and is supported by a sub frame 16 which is fixed to the truck bed 12. The frame 16 has an upper surface 18 (FIG. 2) which supports a plurality of rollers 20 which are rotatable about radial spokes 22 that rotate with a main frame or turntable 24. A fixed vertical sleeve 28 is secured to the sub frame 16 and extends upward through a bearing assembly 26 which is mounted on the turntable.

A double-acting hydraulic cylinder C2 rotates the turntable 24 about the vertical axis of the sleeve 28. For this purpose, the sleeve 28 has a sprocket and chain drive 30 secured to its upper end, and the chain is trained around a rotatable sprocket, not shown, which is carried by the turntable. The cylinder C2 is mounted on the turntable and its piston rod 32 (FIG. 5) is coupled by a bracket 34 to the adjacent flight of the chain. Powered extension or retraction of the piston rod of the cylinder C2 causes the turntable 24 to rotate between angular limits of about 210 degrees so that the spraying apparatus 10 can be aimed more than 100 degrees in either direction from its FIGURE 1 position.

The turntable 24 has an upper bed plate 36 (FIG. 1) with an upstanding angle bar 38 along each longitudinal edge portion of the bed plate. Welded to each angle bar 38 is an upstanding yoke arm 40 which together straddle a power output shaft 42 (FIG. 2). A tie bar 44 interconnects the upper ends of the arms 40. The shaft 42 is driven by a gasoline engine, not shown, which is covered by a housing 45 and has a remotely operable throttle control actuated by a double-acting hydraulic cylinder C1. The piston rod 46 of the cylinder is coupled to a rod 48 which is arranged to pull the throttle open.

Each yoke arm 40 has a generally triangular mounting plate 50 which carries a blower housing support arm 52 that is pivotable about a pivot shaft or stud 54. The studs 54 and the support arms 52 are horizontally aligned across the machine, and the arms 52 are secured to a cylindrical blower housing 56, whereby the blower housing is mounted for swinging movement in a vertical plane about the horizontal axis defined by the pivot studs. Such movement can be effected by remote control to position the blower housing 56 upward 45 degrees or downward 20 degrees from its horizontal position.

A power drive for vertically moving the blower housing 56 includes a single acting hydraulic cylinder C3 (FIG. 2) which is pivoted to an upstanding bracket 58 that is secured to the turntable 24 and has a piston rod 60. The piston rod is pivoted by a stud 62 to a lever 64 which depends from a tubular shaft 66. Shaft 66 is rotatably mounted in the yoke arms 40, and has end portions with lift arms 70 that are secured to the shaft and extend toward the blower housing 56 in vertical alignment with the support arms 52. A pair of links 72 are pivotally connected by bolts 74 to each lift arm 70 and to the superposed blower housing support arm 52, so that extending movement of the piston rod 60 of cylinder C2 will raise the blower housing 56 from its FIGURE 2 lowered position. When the cylinder C2 is de-energized and a later mentioned valve is opened, the hydraulic fluid bleeds from the cylinder and gravity returns the blower housing to its FIGURE 2 position, in which position the lower sector of the housing rests upon a stop and support member 74 which is bolted to the turntable 24.

The housing 56 encloses a conventional axial flow air impeller 76 which has a large diameter hub 77, and is secured to a driveshaft 78. The driveshaft is mounted in bearings 80 atop a support plate 82 that is mounted in a housing 84. The housing has radial legs 86 which are rigidly secured to the blower housing 56. A spinner 88 is secured to the upstream side of the hub 77 of the air impeller, and the hub 77, housing 84 and spinner 88 have the same diameter so as to minimize resistance to the air flow through the blower housing 56.

At its upstream end portion, the driveshaft 78 carries a universal joint coupling assembly 90. A second universal joint coupling assembly 92 is secured to the power output shaft 42, and the two couplings are interconnected by an exteriorly splined shaft 94 and an interiorly splined sleeve 96 to provide a telescoping as well as a flexible drive connection to accommodate the dimensional and angular changes between the universal joint coupling assemblies 90 and 92 as the blower housing 56 pivots about the pivot studs 54. The inlet end of the blower housing is covered by a protective screen 98 which is centrally apertured, as is the spinner 88, to provide clearance around the sleeve 96 and joint 90.

A dischrage head 100, secured to the downstream end of the blower housing 56, is constructed according to the disclosure in the previously identified Patent 3,252,656. One feature of this type of discharge head is that the flow gradient, measured vertically across its discharge opening, can be varied by adjusting the contour of the vertically elongate outlet of the discharge head. The discharge head includes a manifold and nozzle assembly 102 which supplies chemical spray liquid or dusting powder into the air blast from a supply source and pump, not shown. A remotely operable double-acting hydraulic cylinder C5 actuates a valve V11 which controls admission of the chemical to the manifold and nozzle assembly 102 from a supply line 103.

The upper portion of the discharge head 100 is generally circular, and the upper portion of the air blast projected through this portion of the housing can be deflected downward by means of an arcuate, pivotable air deflecting vane 104. The air deflecting vane is connected to the discharge head by a hinge 106 and is remotely operable by a double-acting hydraulic cylinder C4, the piston rod 107 of which is connected to an upright lever 108 affixed to the vane. In its upper position shown in FIGURE 1, the vane 104 is generally aligned with the discharge head 100, and in its lower position shown in FIGURE 2, the vane declines about 45 degrees relative to the upper wall of the discharge head 100 and lies in the path of the airstream.

The lower portion of the spray blast projected from the lowered discharge head 100 (FIG. 3) impinges the ground very close to the truck 14, and the air deflecting vane 104 is automatically lowered after the discharge head 100 is moved to said lowered position so that the upper portion of the spray pattern is directed downward. Thus, this spraying position is especially adapted for close roadside control of weeds and other spraying operations. If the spray blast must be projected farther from the truck down slopes, ravines and into ditches, the air deflecting vane 104 can be raised. If the spray blast must reach upward into trees, the discharge head 100 and the housing 56 can be elevated as a unit. A special feature of the invention is the provision of a single control which can selectively and remotely actuate the power means for controlling elevational movements of the discharge head 100 and up and down movement of the air deflecting vane 104. Before, during or after any of the control movements of the spraying apparatus 10, the engine throttle can be opened or closed, and the manifold and nozzle assembly 102 can be turned on or off. All of the varied controls can be remotely controlled from a single operator's station as a result of the control circuit next described.

The engine which drives the air impeller 76 also drives a hydraulic pump P (FIG. 5) which discharges hydraulic fluid at a pressure of 600 p.s.i. into a conduit or line 110. The line 110 is connected to a pressure reducing valve PR1 which reduces the pressure of the hydraulic fluid to 400 p.s.i. in a line 112 between the valve PR1 and a second pressure reducing valve PR2. A line 114 between the latter valve and a similar valve PR3 carries hydraulic fluid at a pressure of 200 p.s.i. The valve PR3 reduces the pressure to 10–20 p.s.i. for delivery into the intake line 116 of the pump P. Various branch lines, later mentioned, carry differential pressures to the previously mentioned hydraulic cylinders.

Series-connected pairs of normally closed, solenoid operated valves V1–V10 are connected between the lines 110 and 114. Each of these valves is typified by the valve 120 (FIG. 4) and includes a body 122 having an inlet port 124 and an outlet port 126. An armature 128 extends upward into the coil 130 of the valve and has a resilient sealing insert 132 which is urged by a spring 134 into sealing contact with a port communicating with the outlet port 126. An important feature of this type of valve is that reverse flow, under later mentioned conditions, will unseat the sealing insert by forcing the armature upward against the force of the spring 134 and the fluid will be discharged through an inlet orifice 135 to the inlet port 124. In FIGURE 5, an arrow beside each valve V1–V10 indicates the normal flow direction. A suitable valve is manufactured by the Marsh Instrument Company of Skokie, Ill., and is designated as a globe pattern in the 26AR series.

The coils of the solenoid valves V1–V10 have one terminal grounded, and the hot wire 136 is selectively connected to the solenoid coils by spring-centered, lever action single pole double throw switches 138, 140, 142 and 144, and electrical wires 145. These switches are mounted upon a common control panel, not shown, and comprise the remote controls for governing all operations of the spraying apparatus 10 from any desired position. All control components except the switches are a physical part of the spraying apparatus 10.

In the case of the throttle control switch 142, the lever of the switch when moved to "CLOSE" will energize the solenoid of valve V8 and open the valve. Fluid under 600 p.s.i. from the line 110 will thus flow through the open valve V8 into a line 146 to the base of the hydraulic cylinder C1. The opposite end of the cylinder is connected to a line 148 which is under a pressure of 400 p.s.i. The piston of the cylinder C1 is thus extended, the rod 48 pushes the throttle closed, and the displaced fluid passes through the pressure reducing valve PR2. If the switch lever is released, it moves to neutral, but the throttle remains closed because of the pressure differential in the cylinder C1. Moving the lever of switch 142 to "OPEN" will energize the solenoid of the valve V7 and open the valve, whereby fluid under 400 p.s.i. from the line 148 will retract the piston of cylinder C1 because the fluid at the base of the cylinder can drain through the open valve V7 into the line 114. This pulls the throttle rod 48 and opens the engine throttle. It will be noted that the throttle control will lock in positions between fully open and fully closed when the pressure is balanced in the cylinder C1, whereby intermediate engine speeds can be obtained.

Movement of the lever of the spray control switch 144 to "ON" energizes the solenoid of the valve V10 and opens the valve. This admits fluid under 600 p.s.i. to a line 150 and forces the piston rod of the hydraulic cylinder C5 outward, the 400 p.s.i. pressure fluid at the opposite end of the cylinder supplied by a line 151 being displaced past the pressure reducing valve PR2. Cylinder C5 thus opens the spray control valve V11 and the spray material from the supply line 103 is transmitted to the manifold and nozzle assembly 102. When the switch lever is released, the pressure differential in the cylinder C5 remains unchanged and the spray control valve V11 thus stays open. When the switch lever is moved to "OFF," the solenoid of the valve V9 is energized to open the valve. The 600 p.s.i. fluid pressure is thus released through the valve V9 and the 400 p.s.i. pressure in the line 151 causes the piston rod of the cylinder C5 to retract and close the spray control valve V11, thereby stopping the admission of spray droplets into the air blast.

Horizontal rotational control of the spraying apparatus 10 includes the hydraulic cylinder C2 and the switch 140. If the lever of the switch 140 is moved to "RIGHT," the solenoids of valves V3 and V6 are energized and the valves open. The valve V6 transmits fluid under 600 p.s.i. into a line 156 to extend the piston rod 32 of the cylinder C2 and rotate the turntable 24 clockwise, during which a line 158 and the valve V3 bleed fluid from the opposite end of the cylinder C2. Rotation of the turntable in the opposite direction is effected in a similar manner by moving the lever of the switch 140 to "LEFT," thus energizing the solenoids of valves V4 and V5. Releasing the switch lever in any intermediate rotational position of the turntable will lock the turntable 24 in place.

If the blower housing 56 is horizontal, the air deflecting vane 104 is also horizontal, and both are very near their FIGURE 1 positions. Assuming this as a starting position from which the housing will be elevated, the lever of the switch 138 (FIG. 5) is moved to "UP" and the solenoid of the valve V2 is energized and opens the valve. A line 160 transmits fluid from the line 110 through the open valve V2 to the piston rod end of the air deflecting vane cylinder C4. The piston of the cylinder, however, has already reached the limit of its stroke in that direction when a previous, similar actuation of the lever of switch 138 raised the blower housing 56 to what is the assumed starting position. The air deflecting vane 104 thus remains in said horizontal position, but a branch line 162 from line 160 conducts the 600 p.s.i. hydraulic fluid to the blower housing cylinder C3, whereupon the piston rod is forced out of the cylinder and the members 64, 70 and 72 (FIGS. 1 and 2) raise the blower housing 56 and discharge head 100.

If the lever of the switch 138 is next moved in the opposite direction to "DOWN," the solenoid of the valve V1 is energized and the valve opens. Because the weight of the blower housing and associated mechanism tends to force the piston of the cylinder C3 inward, the lines 160 and 162 will bleed the fluid from the cylinder through the open valve V1 into the line 116. The line 160 is carrying fluid at approximately 300 p.s.i. while housing 56 is lowering and communicates with the piston rod end of the air deflecting vane cylinder C4. Since the other end of the cylinder is under 200 p.s.i. through a line 164, the air deflecting vane 104 remains in its up position while the blower housing and discharge head are being lowered. When any desired position is attained short of the fully lowered position, the lever of the switch 138 is released, the valve V1 closes and the pressurized fluid behind the piston of cylinder C3 keeps the blower housing and discharge head in such position. The air deflecting vane 104 remains in its raised position.

If the lowering movement is continued until the cylinder C3 is emptied, thus placing the blower housing and discharge head in their fully lowered position, and the lever of the switch 138 is held in "DOWN" position to lower the blower housing, the fluid pressure in the line 160 will drop below the fluid pressure in the line 164 which is connected to the air deflecting vane cylinder C4. Accordingly, the piston rod of the cylinder C4 moves outward and the air deflecting vane 104 is lowered after the discharge head 100 is fully lowered. This deflects the upper portion of the air blast downward so that the cooperative effect of the lowered discharge head and the lowered air deflecting vane concentrates the spray blast close to the truck, as shown in FIGURE 3, so that roadside ditches, ravines and the like can be adequately covered.

As the truck progresses along the road, it may become necessary to project the spray blast upward onto a bank, into tree foliage, or onto more distant targets. Thus, as previously described, the lever of the switch 138 is moved to "UP" to elevate the discharge head 100. The valve V2 is thereby opened and fluid under 600 p.s.i. flows into the line 160. Since the air deflecting vane cylinder C4 up to this time has been energized with fluid at 200 p.s.i. through the line 164 to hold the air deflecting vane 104 in down position, and because the blower housing and associated parts present a heavy load resistance to the cylinder C3, the fluid at 600 p.s.i. entering the opposite end of the cylinder C4 immediately lifts the air deflecting vane 104 before the discharge head 100 starts to rise. If the switch lever of switch 138 is then quickly released, the blower housing retains its lowered position, but the air deflecting vane 104 is in raised position, and the spray blast will carry farther from the discharge head 100 onto more distant targets. If the discharge head 100 is elevated further, the spray blast can be made to impinge targets such as trees, high banks and the like. It should also be noted that the engine throttle can be adjusted at any time to regulate the velocity and volume of the air blast.

The reverse flow capability previously mentioned for the hydraulic valves ensures that damage to the hydraulic circuitry or mechanical components cannot occur if the sprayer is accidentally or purposely moved manually while it is not in use. If, for instance, the sprayer is rotated about the axis of the turntable 24 by hand, fluid will tend to be forced from the cylinder C2 (FIG. 5) into one of the two lines 156 or 158, depending upon the direction of rotation. The pressure thus developed can unseat the armatures of the valves V4 or V6 so that a reverse flow (from the normal flow direction) will allow the fluid to enter the high pressure line 110. Protection against shock loads during operation is similarly accomplished, as well as damage which might otherwise result from thermal expansion of the hydraulic fluid. In the first instance, shock or sudden inertia loads can be caused by the support vehicle traversing rough ground, so that the spraying apparatus tends to swing away from its aimed position. Thus, if a wheel of the vehicle should drop into a hole, the resulting inertia loading of the cylinder C3 will cause pressures much higher than those normally needed. At a hydraulic circuit pressure of about 650 p.s.i., the armatures 128 (FIG. 4) in the valves 120 will be urged upward and reverse flow of the hydraulic fluid will occur. The rate of reverse flow is restricted by the small inlet orifice 135, as well as by the relatively small control lines. Accordingly, the rate of reverse flow is proportional to the magnitude of the inertia load, and the effect of a conventional hydraulic shock absorber is produced, as well as the previously mentioned safety pressure relief features which prevent damage to the hydraulic circuit components and other parts. These are important features which are believed to be unique in hydraulic circuitry, and permit the use of low cost valves which eliminate the need for the usually required pilot check, counterbalance, cushion and safety valves. Further, the multiple system pressures allow the counterbalancing of heavy loads without exceeding the differential pressure limitations of standard, low cost valves, and makes possible an inexpensive control circuit with extensive control functions.

In summary, one important feature of the spraying apparatus of the present invention is its capability to aim the spray pattern in extreme attitudes whereby it is especially useful in the environment and for the uses previously mentioned and described. Another important feature is the provision of the air deflecting vane 104 and the manner in which it is controlled; the vane can vertically compress the spray pattern so that steep declines from a roadway as well as spray targets closely adjacent the support vehicle can be efficiently covered. The remotely controlled electric-hydraulic control circuit, and the automatic sequencing of the blower lift cylinder and air deflecting vane cylinder by the control circuit is efficient and simple, and is also an important part of the invention.

Having thus described the invention, that which is believed new, and for which protection by Letters Pattern is desired, is:

1. Spraying apparatus comprising a turntable rotatable about a vertical axis, a power unit mounted on said turntable and having a horizontal driving shaft, a blower housing supported by said turntable in spaced relation to said power unit, means mounting said blower housing for pivotal movement about a horizontal axis, an air impeller mounted in said housing, a driven shaft coupled to said impeller, a flexible drive coupling interconnecting said driving and driven shafts, a discharge head secured to said housing for confining the air stream generated by said impeller, an air deflecting vane pivotally mounted on said discharge head for movement into and out of the air stream, individual power means connected to said blower housing, said turntable and said air deflecting vane, remotely operable control means for actuating said turntable power means, and second remotely operable control means for sequentially actuating said blower housing power means and said air deflecting vane power means.

2. Spraying apparatus comprising a frame, a power unit mounted on said frame and having a generally horizontal power output shaft, a driven shaft rotatably mounted in endwise spaced relation to said power output shaft, an air impeller mounted on said driven shaft, a blower housing circumscribing said impeller, means defining a pivot axis for said housing intermediate said power shaft and said driven shaft, the pivot axis of said housing intersecting a projection of the axis of rotation of said power shaft, a flexible drive coupling interconnecting said power output shaft and said driven shaft, said drive coupling comprising a pair of universal joints symmetrically arranged relative to the intersection of said axes, a telescopic shaft coupling between said universal joints, and means for pivoting said housing about its axis to selected positions about said axis.

3. Spraying apparatus comprising a frame, a powered unit mounted on said frame and having a generally horizontal power output shaft, a driven shaft rotatably mounted in endwise spaced relation to said power output shaft, an air impeller mounted on said driven shaft, a blower housing circumscribing said impeller, means defining a pivot axis for said housing intermediate said power shaft and said driven shaft, a flexible drive coupling interconnecting said power output shaft and said driven shaft, a fixed support yoke having upstanding arms straddling said drive coupling, a support arm having one end portion secured to each side portion of said blower housing and having an opposite end portion proximate said yoke arm, said pivot axis comprising a pivot shaft pivotally interconnecting each yoke arm with its associated support arm, and means for pivoting said housing about its axis to selected positions about said axis.

4. Spraying apparatus comprising a frame including a fixed subframe portion and a rotatable upper turntable frame portion supported by said sub frame portion, means defining a vertical pivot axis between said sub frame portion and said turntable frame portion, a power unit mounted on said turntable frame portion and having a generally horizontal output shaft, a driven shaft rotatably mounted in endwise spaced relation to said power output shaft, an air impeller mounted on said driven shaft, a blower housing circumscribing said impeller, means defining a housing pivot axis for said blower housing intermediate said power shaft and said driven shaft, first power means for pivoting said housing about said housing pivot axis to selected positions about said housing axis, a flexible drive coupling interconnecting said power output shaft and said driven shaft, and second power means mounted on one of said frame portions and connected to the other of said frame portions for effecting relative pivotal movement between said frame portions about said vertical pivot axis.

5. Spraying apparatus comprising a frame, a power unit mounted on said frame and having a generally horizontal power output shaft, a driven shaft rotatably mounted in endwise spaced relation to said power output shaft, an air impeller mounted on said driven shaft, a blower housing circumscribing said impeller, said blower housing having a discharge head affixed thereto with a discharge end portion remote from said impeller and having an air deflector vane, means pivotally mounting said deflector vane to the upper sector of said discharge head for movement about a horizontal axis, power means mounted on said discharge head and connected to said deflector vane for effecting pivotal movement of said deflector vane relative to said discharge head, means defining a pivot axis for said housing intermediate said power shaft and said driven shaft, a flexible drive coupling interconnecting said power output shaft and said driven shaft, and means for pivoting said housing about its axis to selected positions about said axis.

6. Apparatus according to claim 4 wherein said blower housing has a discharge head affixed thereto with a discharge end portion remote from said impeller, an air deflector vane, means pivotably mounting said deflector vane to the upper sector of said discharge head, third power means mounted on said discharge head and connected to said deflector vane for effecting pivotal movement of said deflector vane relative to said head, and a selectively positionable single control lever governing said first and third power means, said control lever being arranged to sequentially actuate said first and third power means in one position, and to sequentially operate said third and first power means in another position.

7. Apparatus according to claim 6 wherein said first and third power means include hydraulically operated cylinders, solenoid-operated hydraulic valves controlling said cylinders, and wherein said control lever comprises an electrical switch remotely positioned from said valves.

8. Apparatus according to claim 7 wherein said valves each have a normal flow direction from a fluid inlet port to a fluid outlet port and the flow is controlled by an armature spring-biased to normally close a passage in the valve between said ports, reverse fluid flow from said outlet port to said inlet port occurring upon the developing of a back pressure in the outlet port of the valve in excess of the force of the spring biasing said armature.

9. Apparatus according to claim 4 wherein said blower housing has a discharge head affixed thereto with a discharge end portion remote from said impeller, an air deflector vane, means pivotably mounting said deflector vane to the upper sector of said discharge head for movement about a horizontal axis, third power means mounted on said discharge head and connected to said deflector for effecting pivotal movement of said deflector vane relative to said head, selectively positionable control means governing said first and third power means, said control means being arranged to sequentially actuate said first and third power means in one position, and to sequentially operate said third and first power means in another position, and second control means for actuating said second power means independently of said first control means.

10. Spraying apparatus comprising a frame, a power unit mounted on said frame, a blower housing mounted on said frame and pivotal thereon about a pivot axis, said blower housing having a driven shaft mounted therein on an axis intersecting said pivot axis in any position of the blower housing, an impeller mounted on said driven shaft, a power output shaft mounted in said power unit on an axis intersecting said pivot axis and in end to end relation with the driven shaft, and a flexible drive coupling interconnecting said power output shaft and said driven shaft to rotate the impeller in any position of the blower housing.

References Cited

UNITED STATES PATENTS 2,840,300   6/1958   Carr _____ 239—77 X

STANLEY H. TOLLBERG, *Primary Examiner.*